United States Patent [19]

Kunkel

[11] Patent Number: 5,281,808
[45] Date of Patent: Jan. 25, 1994

[54] DEVICE FOR THE NON-CONTACT CONTROL OF A SANITARY FITTING

[75] Inventor: Horst Kunkel, Schorndorf-Miedelsbach, Fed. Rep. of Germany

[73] Assignee: Hansa Metallwerke AG, Fed. Rep. of Germany

[21] Appl. No.: 986,783

[22] Filed: Dec. 8, 1992

[30] Foreign Application Priority Data

Dec. 19, 1991 [DE] Fed. Rep. of Germany ....... 4141944

[51] Int. Cl.$^5$ .............................................. G01V 9/04
[52] U.S. Cl. ............................ 250/221; 250/214 AG; 250/208.4
[58] Field of Search ............ 250/221, 208.4, 214 AG, 250/560, 221.1; 340/562, 565, 555, 556, 557, 567

[56] References Cited

U.S. PATENT DOCUMENTS 4,403,142 9/1983 Kondo .................................. 250/221
4,902,887 2/1990 Everett, Jr. .......................... 250/221

Primary Examiner—David C. Nelms
Assistant Examiner—Que T. Le
Attorney, Agent, or Firm—Fred Philpitt

[57] ABSTRACT

A device for the non-contact control of a sanitary fitting comprises in an emitting/receiving unit, in addition to an emitter and a receiver and their associated detection circuit as is known, a second receiver which can be reached directly by the radiation emitted by the emitter, and with which a second detection circuit is associated. In an initialization mode in front of a stationary reflector, the operating voltage of the emitter or the amplification of the detection circuits is continuously increased by a control unit until the desired sensitivity is reached. The values of representative voltages at which the two detection circuits are triggered are stored in respective stores. The quotient of these two values is put into a third store. In an adjusting mode, which is executed at set time intervals, the control unit continuously increases the operating voltage of the emitter, or the amplification of the detection circuits, and finds the value of the representative voltage at which the second detection circuit releases an output signal. This value is passed, together with the quotient stored in the third store, to a multiplier. The output signal of the latter is representative of a desired operating voltage of the emitter or amplification of the detection circuits, which is finally set by a microprocessor.

10 Claims, 1 Drawing Sheet

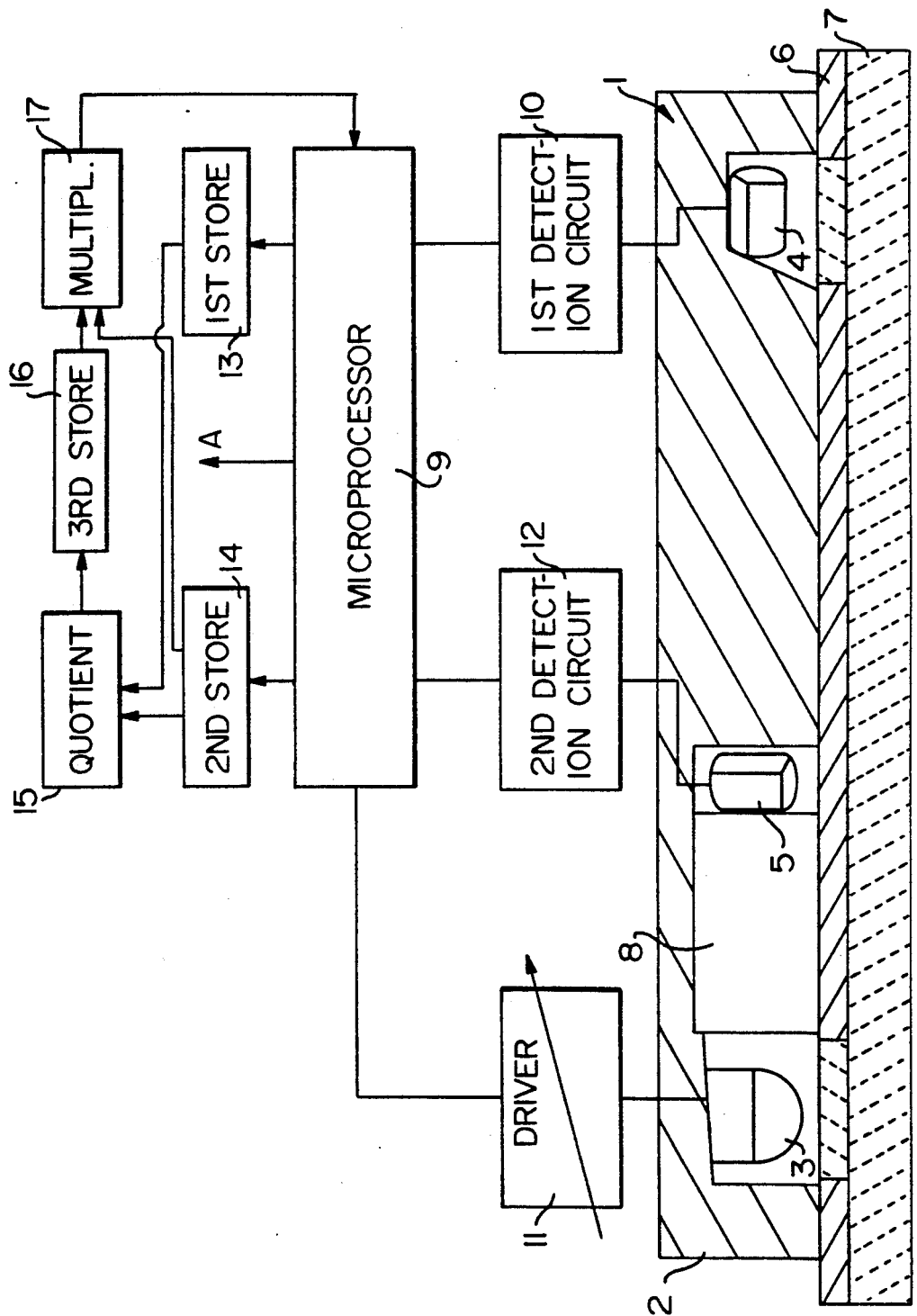

DEVICE FOR THE NON-CONTACT CONTROL OF A SANITARY FITTING

BACKGROUND TO THE INVENTION

The invention relates to a device for the non-contact control of a sanitary fitting, which can be accommodated, for example, in the wall behind a urinal or a shower, or directly in the sanitary fitting to be controlled.

A device for the non-contact control of a sanitary fitting is disclosed in DE-A-3408261. It comprises:

a) an emitting/receiving unit which includes an emitter which emits radiation into a monitoring space, and a first receiver which receives radiation reflected by an object in the monitoring space; and b) a circuit arrangement which includes a driving circuit providing a voltage for operating the emitter, the magnitude of which voltage determines the intensity of the radiation emitted, and a first detection circuit to which the output signal of the first receiver is applied and which generates an output signal when the output signal of the first receiver exceeds a certain threshold value.

A problem exists with devices of this kind that the electronic and/or mechanical components age, which can affect the sensitivity of the arrangement as a whole. If the sensitivity decreases during the operating period, for example over a period of years, the monitoring space in which the device responds to any objects present becomes steadily smaller.

This problem is addressed in the device disclosed in DE-A-3408261 as follows: the emitter is continuously operated at such a high output that reflections from stationary objects are received. A long-time mean value is determined from the received signals constantly registered in that manner. The instantaneous value of the received signal is compared with the long-time mean value. Only when there is a certain minimum deviation from that long-time mean value is the circuit arrangement triggered. With these measures, it is possible to achieve both an initial "self-adjustment" of the circuit arrangement to specific surroundings, and also a re-adjustment to compensate for continuous changes in the surroundings and internal ageing processes.

The arrangement of the device disclosed in DE-A-3408261 is that, in order to determine the long-time mean value, the circuit arrangement has to be powered continuously, and to a level at which reflections from stationary objects are detected by the receiver. In cases where the circuit arrangement is to be powered by a battery at all events, this involves unacceptable energy consumption. Furthermore, this known device fails to work when there are no stationary objects in the vicinity from which radiation could be reflected in order to form the long-time mean value.

A device for the non-contact control of a sanitary fitting is disclosed in DE-A-4019927, which has a special operating mode executed at set time intervals, for setting and re-adjusting the sensitivity. In this special operating mode, the output of the emitter is increased in steps until the radiation reflected to the receiver from stationary objects reaches a value at which the detection circuit is triggered. The emitter output is then reduced again slightly and thus reaches a value at which the stationary objects do not quite cause triggering. This device also achieves a self-adjustment both to internal ageing processes and to changes in the surroundings. There is no increased energy consumption with this device. Nevertheless, in this case also, suitable stationary objects that can be used for self-adjustment need to be present.

SUMMARY OF THE INVENTION

In one aspect, the present invention provides a device for the non-contact control of a sanitary fitting, which comprises:

a) an emitting/receiving unit comprising:
   aa) an emitter which emits radiation into a monitoring space,
   ab) a first receiver which receives radiation reflected by an object in the monitoring space, and
   ac) a second receiver which can be reached by a direct route by a defined part of the radiation emitted by the emitter;

b) a circuit arrangement comprising:
   ba) a driving circuit providing a voltage for operating the emitter, the magnitude of voltage determining the intensity of the emitted radiation,
   bb) a first detection circuit to which the output signal of the first receiver is applied and which generates an output signal when the output signal of the first receiver exceeds a certain threshold value,
   bc) a control unit which is capable of continuously increasing the output voltage of the driving circuit, starting at a low value,
   bd) a second detection circuit to which the output signal of the second receiver is applied and which generates an output signal when the output signal of the second receiver exceeds a certain threshold value,
   be) a first store,
   bf) a second store,
   bg) a quotient former which forms the quotient of the contents of the first store and the second store,
   bh) a third store in which the quotient produced by the quotient former can be stored, and
   bi) a multiplier which forms the product of the contents of the second store and the third store;

the device being capable of being operated:

(i) in an initialisation mode, in which the control unit continuously increases the output voltage of the driving circuit, starting at a low value, and puts a value that is representative of that output voltage into the first store when the first detection circuit releases an output signal, and puts a value that is representative of that output voltage into the second store when the second detection circuit releases an output signal, such that there is stored in the third store a value that is representative of the quotient of the output voltages of the driving circuit at which the first detection circuit and the second detection circuit generate a respective output signal, and (ii) in an adjusting mode, in which the control unit continuously increases the output voltage of the driving circuit, starting at a low value, and puts a value that is representative of that output voltage into the second store when the second detection circuit generates an output signal, such that there is produced in the multiplier a value that is representative of a desired output voltage of the driving circuit, according to which the control circuit brings the output voltage of the driving circuit up to the desired output voltage.

The device of the invention has the advantage that it is simple and inexpensive to produce, and that it can operate with little energy consumption and little expenditure on apparatus. The sensitivity of the device can be to re-adjusted in the case of internal ageing processes, even when there are no stationary objects from which the emitted light is continuously reflected.

The second receiver in the emitting/receiving unit, which is in direct radiation link with the emitter, forms an internal reference point of the device according to which the original sensitivity can be restored after internal ageing processes.

The sensitivity is determined in one of the two special operating modes, namely the initialisation mode. For that purpose, a standard object having a defined reflection capability is placed at a defined standard distance, for example one meter, in front of the emitting/receiving unit. Then, not only is there determined the value of the output voltage of the driving circuit (corresponding to the value of the operating voltage of the emitter) at which the first receiver (which performs the actual monitoring function in the normal operating mode) comes to be triggered, but also the value of the output voltage of the driving circuit at which the second detection circuit generates an output signal (as a result of the radiation impinging directly on the second receiver) is also found and stored. The circuit arrangement determines the factor by which the output voltage of the driving circuit when the first detection circuit is triggered differs from the output voltage at which the second detection circuit is triggered. This factor is permanently stored in the third store. The factor held in the third store therefore reflects the individual characteristics of the particular device for the non-contact control of a sanitary fitting after initialisation (which may optionally be carried out at the factory).

The sensitivity of the device is re-adjusted as follows: after a certain period of operation of the device, the second special mode (an adjusting mode) is executed. An internal reference is used for this purpose, there is used as an internal reference for possible internal changes in those electrical components which determine the output voltage of the driving circuit, by which the second detection circuit is triggered. This output voltage can be determined without an external reference, that is to say, without external stationary objects. If, for example, an internal amplification factor has decreased as a result of ageing processes of the electronic components, the output voltage of the driving circuit must be brought to a higher value than before in order for the second detection circuit to respond. Under the plausible assumption that the ageing behaviour of the two receivers and the two detection circuits will be approximately the same, it is easily possible to determine the output voltage of the driving circuit at which the sensitivity of the first receiver, that is to say the receiver responsible for the actual monitoring function, will be restored to the original value. The output voltage of the driving circuit at which the second detection circuit was triggered then simply needs to be increased by precisely the factor determined in the initialisation mode and stored in the third store. The adjusting mode is brought to an end by bringing the output voltage of the driving circuit, by means of the microprocessor, to that desired value so determined.

In another aspect, the invention provides a device for the non-contact control of a sanitary fitting, which comprises:
a) an emitting/receiving unit comprising:
- aa) an emitter which emits radiation into a monitoring space,
- ab) a first receiver which receives radiation reflected by an object in the monitoring space, and
- ac) a second receiver which can be reached by a direct route by a defined part of the radiation emitted by the emitter;

b) a circuit arrangement comprising:
- ba) a driving circuit providing a voltage for operating the emitter, the magnitude of voltage determining the intensity of the emitted radiation,
- bb) a first detection circuit to which the output signal of the first receiver is applied and which generates an output signal when the output signal of the first receiver exceeds a certain threshold value,
- bc) a second detection circuit to which the output signal of the second receiver is applied and which generates an output signal when the output signal of the second receiver exceeds a certain threshold value,
- bd) a control unit which is capable of continuously increasing the amplification of the two detection circuits, starting at a low value,
- be) a first store,
- bf) a second store,
- bg) a quotient former which forms the quotient of the contents of the first store and the second store,
- bh) a third store in which the quotient produced by the quotient former can be stored,
- bi) a multiplier which forms the product of the contents of the second store and the third store, the device being capable of being operated:
(i) in an initialisation mode, in which the control unit continuously increases the amplification of the detection circuits, starting at a low value, and puts a voltage value that is representative of that amplification into the first store when the first detection circuit releases an output signal, and puts a voltage value that is representative of that amplification into the second store when the second detection circuit releases an output signal, such that there is stored in the third store a value that is representative of the quotient of the amplifications of the detection circuits at which the first detection circuit and the second detection circuit generate a respective output signal, and
(ii) in an adjusting mode, in which the control unit continuously increases the amplification of the second detection circuit, starting at a low value, and puts into the second store a value that is representative of the amplification at which the second detection circuit generates an output signal, such that there is generated in the multiplier a value that is representative of a desired amplification of the first detection circuit, according to which the control circuit brings the amplification of the first detection circuit up to the desired amplification.

The first and second aspects of the invention differ in that, according to the second aspect, the sensitivity of the device is set by way of the amplification of the detection circuits rather than by way of the emitter output.

Preferably, the control device of the invention includes a device located between the emitter and the second receiver which attenuates the radiation emitted by the emitter. The attenuation can simulate to a degree the radiation loss which can occur when the path taken by the radiation between the emitter and the second receiver is significantly shorter than the path between the emitter and the first receiver, across the monitoring space and the object located therein.

The attenuating device may consist of a block of material that absorbs the radiation of the emitter in a defined manner.

Suitable alternatives to this are an aperture diaphragm or, in general, a corresponding geometrical shaping of the radiation path between the emitter and the second receiver.

The two detection circuits may be physically formed by the same components, which are alternatively connected either to the first receiver and the first store, or to the second receiver and the second store. This can be feasible since the two detection circuits are generally not operated simultaneously, but are operated one after the other.

BRIEF INTRODUCTION TO THE DRAWING

The drawing is a schematic representation of the emitting/receiving unit of a device for the non-contact control of a sanitary fitting, with the circuit arrangement used to operate it.

DESCRIPTION OF PREFERRED EMBODIMENTS

In the drawing, reference numeral 1 denotes an emitting/receiving unit which, depending on the field of use, can be accommodated, for example, in the wall behind a urinal or a shower, or directly in the sanitary fitting to be controlled. The emitting/receiving unit 1 comprises a holding block 2 in which an emitting diode 3, a first receiving diode 4 and a second receiving diode 5, which acts as a reference diode, are accommodated. Arranged in front of the various diodes 3, 4 and 5 is a filter plate 6 which, in the region immediately in front of the diodes 3, 4, is transparent to the working wavelength of the radiation used (generally infrared radiation). In front of the filter plate 6 there is an additional cover plate 7 for decorative and protective purposes which is also transparent at least in the working wavelength range.

Between the emitting diode 3 and the second receiving diode 5 a direct optical connection exists within the emitting/receiving unit 1. In that connection there is a block 8 consisting of a material that attenuates the radiation reaching the receiving diode 5 from the emitting diode 3 in a defined manner.

The entire circuit arrangement is controlled by a microprocessor 9. The latter comprises, in a manner known per se, a first detection circuit 10 which is connected to the first receiving diode 4. The first detection circuit 10 releases an output signal when the radiation received by the first receiving diode 4 exceeds a certain threshold value. In normal operation, the output signal of the first detection circuit 10 is used by the microprocessor 9, in a conventional manner, to generate an output signal A with which the flow of water through the sanitary fitting is released or ended.

The emitting diode 3 is acted upon by a driving circuit 11 of which the output voltage which is applied to the emitting diode 3 can be altered by the microprocessor 9. In normal operation of the device, the driving circuit 11 is operated at a constant output voltage. The microprocessor 9, the driving circuit 11 (with constant output voltage), the emitting diode 3, the first receiving diode 4 and the first detection circuit 10 thus represent, in normal operation of the device, components such as those also found in principle in known devices for the non-contact control of sanitary fittings.

The further components, which have not yet been described, are used exclusively in the special operating modes which serve to determine and re-adjust the sensitivity.

The most important component amongst these is the second receiving diode 5 which is in direct optical connection via the block 8 with the emitting diode 3. The output signal of the second receiving diode 5 is processed by the second detection circuit 12 in essentially the same manner as the first detection circuit 10 processes the output signal of the first receiving diode 4: it releases an output signal when the output signal of the second receiving diode 5 exceeds a certain threshold value.

Other circuit components required in the special operating modes are a first store 13, a second store 14, a quotient former 15 to which the contents of the two stores 13 and 14 are supplied for forming the quotient, a third store 16 in which the value formed by the quotient former 15 is stored, and a multiplier 17 which is able to form the product of the contents of the second store 14 and the third store 16 and pass it to the microprocessor 9.

The mode of operation of the further components just mentioned is as follows:

The sensitivity of the device for the non-contact control of a sanitary fitting is already pre-set and determined at the factory in an initialisation mode. For that purpose, the emitting/receiving unit 1 is positioned at a certain distance, for example one meter, in front of an object having a defined reflection capability. With the aid of the microprocessor 9, the output voltage of the driving circuit 11 is continuously increased, as a result of which the intensity of the light radiated by the emitting diode 3 continuously increases in the same proportion. At the same time, a watch is kept on when the first detection circuit 10 and the second detection circuit 12 release an output signal. The value of the output signal released by the driving circuit 11 at which the second detection circuit 12 responds, or a corresponding voltage value representative thereof, is put into the second store 14. Correspondingly, the value of the output voltage of the driving circuit 11 at which the first detection circuit 10 responds, or a corresponding voltage value representative thereof, is put into the first store 13. From these two voltage values the quotient is formed in the quotient former 15 and is put into the third store 16. The contents of the store 16 will not be erased for the entire operating time of the device; if they are unintentionally lost, the initialisation mode must be repeated.

In the course of time, the various electrical components and, to a certain extent, also the mechanical components of the device undergo a certain ageing which may cause the overall sensitivity to change. The original sensitivity can be restored in an adjusting mode at set time intervals in the following manner:

The adjusting mode is initiated by continuously increasing the output voltage of the driving circuit 11, starting from a low value, for example the value 0, by means of the microprocessor 9, in a manner similar to that in the initialisation mode. During this operation, in contrast to the initialisation mode, only the output signal of the second detection circuit 12 is observed. When the second detection circuit 12 responds, the value of the output voltage of the driving circuit 11 is put into the second store 14 again. The contents of that store 14 are then applied, in the adjusting mode, to one input of the multiplier 17, to the second input of which the contents of the third store 16, that is to say the quotient determined in the initialisation mode, is applied. The multiplier 17 forms the product of these two quantities. This product corresponds to that value of the output voltage of the driving circuit 11 at which it must be operated in order to restore the original sensitivity in normal operation. The microprocessor 9, to which the output signal of the multiplier 17 is applied, therefore sets the driving circuit 11 to that output voltage. This completes the adjusting mode. The entire device can return to normal operating mode. It then has once more the same sensitivity as that set at the factory in the initialisation mode.

In the above description of the illustrative embodiment, two separate detection circuits 10 and 12 were provided for the first receiving diode 4 and the second receiving diode 5. Since, however, the two detection circuits 10 and 12 are generally needed not simultaneously but only one after the other, their function can also be assumed by a single detection circuit which is alternately connected to the two receiving diodes 4 and 5 and the corresponding stores 13 and 14, respectively, by the microprocessor.

A second embodiment, which is not shown in the drawing, operates in a manner similar to that described above. In this case, however, the emitter output is kept constant. Instead, in the initialisation mode when setting the initial sensitivity and determining the values characteristic thereof which are to be put into the first and second stores, the amplification of the two detection circuits is changed. This takes place correspondingly in the adjusting mode also, in which the amplification of the first detection circuit is so re-adjusted that the original sensitivity of the device is achieved again, with the amplification at which the second detection circuit is triggered serving as the "internal reference point".

What is claimed is:

1. A device for the non-contact control of a sanitary fitting, which comprises:
a) an emitting/receiving unit comprising:
   aa) an emitter which emits radiation into a monitoring space,
   ab) a first receiver which receives radiation reflected by an object in the monitoring space, and
   ac) a second receiver which can be reached by a direct route by a defined part of the radiation emitted by the emitter;
b) a circuit arrangement comprising:
   ba) a driving circuit providing a voltage for operating the emitter, the magnitude of voltage determining the intensity of the emitted radiation,
   bb) a first detection circuit to which the output signal of the first receiver is applied and which generates an output signal when the output signal of the first receiver exceeds a certain threshold value,
   bc) a control unit which is capable of continuously increasing the output voltage of the driving circuit, starting at a low value,
   bd) a second detection circuit to which the output signal of the second receiver is applied and which generates an output signal when the output signal of the second receiver exceeds a certain threshold value,
   be) a first store,
   bf) a second store,
   bg) a quotient former which forms the quotient of the contents of the first store and the second store,
   bh) a third store in which the quotient produced by the quotient former can be stored, and
   bi) a multiplier which forms the product of the contents of the second store and the third store;
the device being capable of being operated:
(i) in an initialisation mode, in which the control unit continuously increases the output voltage of the driving circuit, starting at a low value, and puts a value that is representative of that output voltage into the first store when the first detection circuit releases an output signal, and puts a value that is representative of that output voltage into the second store when the second detection circuit releases an output signal, such that there is stored in the third store a value that is representative of the quotient of the output voltages of the driving circuit at which the first detection circuit and the second detection circuit generate a respective output signal, and
(ii) in an adjusting mode, in which the control unit continuously increases the output voltage of the driving circuit, starting at a low value, and puts a value that is representative of that output voltage into the second store when the second detection circuit generates an output signal, such that there is produced in the multiplier a value that is representative of a desired output voltage of the driving circuit, according to which the control circuit brings the output voltage of the driving circuit up to the desired output voltage.

2. A device as claimed in claim 1, which includes a device which attenuates the radiation emitted by the emitter in a defined manner, located between the emitter and the second receiver.

3. A device as claimed in claim 2, in which the attenuating device consists of a block of material that absorbs the radiation of the emitter in a defined manner.

4. A device as claimed in claim 2, in which the attenuating device consists of an apertured diaphragm.

5. A device as claimed in claim 1, in which the two detection circuits are physically formed by the same components, which can be connected either to the first receiver and the first store or to the second receiver and the second store.

6. A device for the non-contact control of a sanitary fitting, which comprises:
a) an emitting/receiving unit comprising:
   aa) an emitter which emits radiation into a monitoring space,
   ab) a first receiver which receives radiation reflected by an object in the monitoring space, and
   ac) a second receiver which can be reached by a direct route by a defined part of the radiation emitted by the emitter;
b) a circuit arrangement comprising:
   ba) a driving circuit providing a voltage for operating the emitter, the magnitude of voltage determining the intensity of the emitted radiation,
   bb) a first detection circuit to which the output signal of the first receiver is applied and which generates an output signal when the output signal of the first receiver exceeds a certain threshold value,
   bc) a second detection circuit to which the output signal of the second receiver is applied and which generates an output signal when the output signal of the second receiver exceeds a certain threshold value, bd) a control unit which is capable of continuously increasing the amplification of the two detection circuits, starting at a low value,
be) a first store,
bf) a second store,
bg) a quotient former which forms the quotient of the contents of the first store and the second store,
bh) a third store in which the quotient produced by the quotient former can be stored,
bi) a multiplier which forms the product of the contents of the second store and the third store,
the device being capable of being operated:
(i) in an initialisation mode, in which the control unit continuously increases the amplification of the detection circuits, starting at a low value, and puts a voltage value that is representative of that amplification into the first store when the first detection circuit releases an output signal, and puts a voltage value that is representative of that amplification into the second store when the second detection circuit releases an output signal, such that there is stored in the third store a value that is representative of the quotient of the amplifications of the detection circuits at which the first detection circuit and the second detection circuit generate a respective output signal, and
(ii) in an adjusting mode, in which the control unit continuously increases the amplification of the second detection circuit, starting at a low value, and puts into the second store a value that is representative of the amplification at which the second detection circuit generates an output signal, such that there is generated in the multiplier a value that is representative of a desired amplification of the first detection circuit, according to which the control circuit brings the amplification of the first detection circuit up to the desired amplification.

7. A device as claimed in claim 6, which includes a device which attenuates the radiation emitted by the emitter in a defined manner, located between the emitter and the second receiver.

8. A device as claimed in claim 7, in which the attenuating device consists of a block of material that absorbs the radiation of the emitter in a defined manner.

9. A device as claimed in claim 7, in which the attenuating device consists of an apertured diaphragm.

10. A device as claimed in claim 6, in which the two detection circuits are physically formed by the same components, which can be connected either to the first receiver and the first store or to the second receiver and the second store.

* * * * *